United States Patent Office 2,854,347
Patented Sept. 30, 1958

2,854,347

METHOD OF EROSION CONTROL OF MINERAL PRODUCTS

Robert B. Booth and James A. Melchore, Stamford, Conn., assignors to American Cyanamid Company, New York, N. Y., a corporation of Maine No Drawing. Application June 14, 1954
Serial No. 436,708

10 Claims. (Cl. 117—6)

This invention relates to an improved method of preventing the erosion of finely-divided ores, coal, mineral concentrates, mineral fines, flotation tailings, cyanidation tailings, and the like, by stabilizing the surface of such mineral products against the erosive action of wind and water.

The need for an inexpensive and practicable method for preventing losses of mineral products through wind and water erosion has long been urgent. For example, a serious problem is presented in the haulage of fine coal in rail cars where wind blown losses of coal in transit are quite severe.

In the prior application of Robert B. Booth et al., Serial No. 359,206, filed June 2, 1953, there is described and claimed a method of controlling windage losses of mineral products by the application thereto of water-soluble synthetic polymers of a monoethylenically unsaturated compound. The thereindescribed polymers appear to form a filmlike crust or layer over the mineral particles so that they are at least partially immobilized with the result that the fine minerals are much less readily blown about or disseminated into the atmosphere.

In accordance with the present invention, it has now been found that a much more effective control of wind and water erosion can be accomplished by applying to the surface of minerals an elastomeric substance. The application to the surface of minerals of an elastomer, as more particularly hereinafter described, results in practically complete immobilization of the dusts of such products as well as preventing, for all practical purposes, erosion of the surface of such products by the action of water or of wind and air currents. For example, carload lots of fine coal have been sprayed with emulsions of the elastomers and have been shipped long distances without any appreciable loss of coal due to the normally erosive action of water and wind. Apparently, when the elastomers of the present invention are applied to the surface of mineral products and the like, a resilient film is produced which keeps the surfaces intact and, consequently, erosion thereof due to wind or water is substantially completely eliminated.

The elastomeric substances of the present invention include natural rubbers such as gutta-percha, latex, balata, caoutchouc and the like, and the synthetic rubber-like polymers, as for example, copolymers of butadiene with a monoolefinic monomer such as styrene, methylstyrene, dimethylstyrene, acrylonitrile, etc. Other suitable copolymers are methyl, ethyl and butyl acrylates with acrylonitrile, and methyl, ethyl and butyl acrylate-styrene copolymers, the components being so chosen as to proportions so as to produce elastomers. Still other useful materials are plasticized polyvinyl acetate, plasticized polyvinyl chloride, plasticized polystyrene and plasticized substituted polystyrenes as well as polyethylenes and polyisobutylenes.

The elastomers which are useful in the present invention must possess two important characteristics. They must be capable of forming a continuous film, and they must be water-insoluble. The foregoing described elastomers, that is, both the natural rubbers as well as the synthetic polymers, possess these necessary requirements.

The synthetic polymers are also preferably used in latex form, that is a dispersion of the synthetic polymer or copolymers in an aqueous medium such as that ordinarily obtained by an emulsion polymerization process. Or suitable solutions thereof in organic solvents may also be used, as for example, methyl ethyl ketone, toluene, and other hydrocarbon solvents. Suitable commercially available elastomers that may be used are natural rubber latex, copolymers of butadiene with styrene (GRS), acrylonitrile (GRN), isobutylene (GRI), as well as isoprene, neoprene, and the like.

The quantity of either the natural rubber latex or synthetic polymer latex or solutions of polymers in organic solvents that are used to immobilize mineral products from the erosive action of wind or water is not unduly critical. Obviously, there must be sufficient solids distributed per square foot of surface so as to cause the surface thereof to remain intact. In general, we have found that from about 0.5 pounds of such solids to about 15 pounds of solids per 100 square feet of surface area affords effective control of wind and water erosion of the surface particles.

It has been observed that when the surfaces of the mineral particles which are to be stabilized against erosion are dry, more elastomer is required. Therefore, in such cases, it is preferred to pre-wet the mineral surfaces either with water or with solutions of suitable wetting agents in water in order to lessen the quantity of elastomer needed. Also, not all mineral surfaces require the same quantity of elastomer in order to stabilize the surface. This appears to vary somewhat with the nature of the mineral products and the degree to which stabilization of the surface thereof against erosive windage losses is to be effected. For optimum beneficial effect therefore, as well as from an economic standpoint, we prefer to use from about 1.0 to about 3.0 pounds of latex solids per 100 square feet of surface area.

The invention will be described in greater detail in conjunction with the following specific examples.

Example 1

Five separate railcar shipments of about 60 tons each of anthracite coal, No. 5 buckwheat coal and flotation concentrates, obtained from the treatment of high ash fines, were sprayed with a styrene-butadiene copolymer (GRS 2000 latex), in amounts of 1.7–3.3 lbs. solids per 100 square feet of exposed surface. The data obtained is shown in the following table:

| Coal Treated—Type | GRS 2000 pounds solids per 100 sq. ft. of surface | Miles Shipped | Pounds of Coal Lost |
|---|---|---|---|
| Flotation Concentrate (minus 20 plus 200 mesh) | 3.3 | 75 | none |
| Do | 3.3 | 1,200 | none |
| #5 Buckwheat Coal | 1.7 | 800 | none |
| Do | none (control) | 800 | 6,200 |
| Do | 3.3 | 1,200 | none |

It will be noted from the above data that cars containing coal and flotation concentrates which were treated in accordance with this invention were found to have incurred no windage losses in transit, whereas the untreated car incurred a loss of coal amounting to 6200 pounds due to wind blown loss.

Example 2

Various types of coal were placed in open containers which were approximately 2 inches in depth and equipped with fine screen bottoms covered with cheese cloth. These containers were constructed so as to expose, after leveling, one square foot of coal surface. Wet coal was placed in these containers, leveled off and sprayed with natural rubber latex at the rate of 1.67 and 3.4 lbs. solids per 100 square feet of surface. Barley size anthracite, minus 28 mesh anthracite and minus ¼-inch bituminus coal were treated in this manner and on standing overnight firm surfaces were produced, which were highly resistant to erosion by water and air currents. Water was allowed to flow on to the coal surfaces at the rate of 3500 cc. per minute from a laboratory ⅜-inch hose for 15 minutes and drained through the coal but did not cause surface breakage. Likewise a flow of air from a ⅜-inch laboratory hose was directed against the surfaces at the rate of 0.7 cubic foot per minute without causing surface breaks. These flows of water and air disintegrated the surfaces of untreated coal and caused a scattering of the coal particles.

Example 3

The tests described in Example 2 were repeated using the following types of coal: anthracite and bituminous coal dusts, minus 28 mesh anthracite fines, No. 4 buckwheat anthracite, minus ¼-inch bituminous coal, concentrates obtained by the flotation of both fine anthracite and bituminous high ash coals. In all cases firm surfaces were produced by the application of GRS 2000 latex, 1.67 and 3.4 lbs. solids per 100 square feet of surface. Separate streams of air and water were directed against these surfaces for 5–10 minutes as in Example 2 without causing surface breaks. The surfaces were highly resistant toward jarring and shock. Untreated samples of coal formed loose surfaces from which the coal particles were readily dislodged by action of currents of air or water.

Example 4

Samples of barley size anthracite coal were treated with emulsions of the following polymers in amounts of 1.0 lb. solids per 100 square feet of surface area:

| Polymer | Composition |
| --- | --- |
| 1 | Copolymer of Styrene-Butadiene (70–30). |
| 2 | Copolymer of Ethyl acrylate-Acrylonitrile (70–30). |
| 3 | Copolymer of Ethyl acrylate-Styrene (90–10). |
| 4 | Plasticized Polyvinyl Acetate. |
| 5 | Copolymer of Butadiene-Methyl Styrene (75–25). |

The testing procedure outlined in Example 2 was followed. All surfaces were found to be highly resistant to the action of streams of air and water.

Similar results were obtained with a solution of styrene-butadiene (70–30) in toluene.

Example 5

Aqueous emulsions of polymers 1–4 of Example 4, GRS 2000 latex and natural rubber latex in amounts of 1.0 lb. of solids per 100 square feet were applied in a series of separate tests to a fine silica product and tested in the manner described in Example 2. All the surfaces so treated showed high resistance toward abrasion and erosion.

Emulsions of the above polymers were also applied to a minus 35 mesh mixture of silica and feldspar. Satisfactory surfaces were obtained in all cases.

Example 6

Emulsions of polymers 1–4 of Example 4 and also natural rubber and GRS 200 latices, 1.0 lb. solids per 100 square feet, were separately sprayed on one-inch layers of wet bituminous coal dust. All the resulting surfaces after drying were firm and were resistant to air and water erosion.

Example 7

A coal concentrate obtained by the flotation of high ash anthracite coal was sprayed with the latex resulting from the emulsion copolymerization of ethyl acrylate and acrylonitrile (90:10) in an amount of 1.0 lb. solids/100 square feet of surface. A firm resilient surface was obtained.

Example 8

A phosphate concentrate obtained in the flotation of fine phosphate rock was treated with the latex as in Example 7. A hard, firm surface was obtained.

Example 9

A fine silica product such as used in the glass industry was sprayed with plasticized polyvinyl acetate, 0.5 lb. per 100 square feet of surface. A firm surface resulted from this treatment which was also resistant to air and water erosion.

Example 10

A gold ore was ground to minus 200 mesh and cyanided to dissolve the gold values. The resulting tailing product was filtered off, washed and pumped to a storage pile which, on drying out, was subject to wind erosion. The erosion was prevented by spraying the pile with water followed by spraying with 2.3 lbs. of GRS 2000 latex per 100 square feet of surface area.

Example 11

An accumulation of bituminous coal dust about 1-inch in thickness was wet by spraying with a solution containing 0.05% sodium dioctylsulfosuccinate and then sprayed with GRS 2000 latex, 4.0 lb. solids per 100 square feet. The dust was then allowed to dry. The resulting surface was immobilized to the action of air currents.

Example 12

An accumulation of dry rock dust, typical of that produced in quarrying operations, was treated as described in Example 11, except that the wetting agent used was of the sulfonated hydrocarbon type and an emulsion of a copolymer of ethyl acrylate and styrene (90:10) was employed in amounts of 1.5 lb. of solids per 100 square feet. In this case also the surface was immobilized to the action of wind.

Example 13

Samples of the fines resulting from crushing a copper ore were treated with plasticized polyvinyl acetate, 3.0 lb. of solids per 100 square feet, and on drying were found to be immobilized toward the action of air currents.

Example 14

Samples of copper, lead, and zinc concentrates produced by the flotation of sulfide ores were sprayed respectively with 2.1 lb. plasticized polyvinyl acetate, 1.9 lb. of a butadiene-methyl styrene copolymer (75:25) and 2.7 lb. GRS 2000 latex per 100 square feet of surface. In all cases surfaces, ordinarily easily blown by wind action, were rendered firm and resistant to wind action.

Example 15

The concentrate and tailing products resulting from the flotation of a fluorite ore were treated with 2.5 lb. of natural rubber latex solids per 100 square feet of surface. An immobilized surface was obtained.

Example 16

A sample of fine sulfur was wet with a solution of 0.1% concentration of sodium dioctylsulfosuccinate and sprayed with GRS 2000 latex, 5.0 lb. solids per 100 square feet of surface. The sample on drying was resistant to wind erosion.

*Example 17*

An accumulation of foundry dusts, which when dry were ordinarily readily susceptible to movement by currents of air, was immobilized by spraying with an emulsion of a copolymer of ethyl acrylate and styrene (90:10), 2.0 lb. solids per 100 square feet of surface. The dusts were immobilized.

*Example 18*

An accumulation of the dusts produced by the dry grinding of metals, a mixture of various fine metallic particles, wheel grit, etc. was sprayed with an emulsion of the copolymer of butadiene and methyl styrene (75:25), 3.0 lb. solids per 100 square feet. The treatment readily immobilized the dusts and prevented their movement by air currents.

We claim:

1. The process of protecting the surfaces of relatively large masses of finely-divided minerals on exposure to the elements so as to prevent wind and water erosion of the minerals which comprises applying to the surface of the masses of finely-divided minerals a relatively thin coating at a rate of from 0.5 to 15 pounds of solids per 100 square feet of area of mineral mass of a natural rubber latex and which extends downwardly into the mass of minerals only a fraction of the total depth of the mass so as to provide a continuous film over the surface of the minerals whereby the normally exposed surfaces are rendered resistant to the erosive action of wind and water.

2. The process of protecting the surfaces of relatively large masses of finely-divided minerals on exposure to the elements so as to prevent wind and water erosion of the minerals which comprises applying to the surface of the masses of finely-divided minerals a relatively thin coating at a rate of from 0.5 to 15 pounds of solids per 100 square feet of area of mineral mass of an emulsion of a copolymer of butadiene and styrene and which extends downwardly into the mass of minerals only a fraction of the total depth of the mass so as to provide a continuous film over the surface of the minerals whereby the normally exposed surfaces are rendered resistant to the erosive action of wind and water.

3. The process of protecting the surfaces of relatively large masses of finely-divided minerals on exposure to the elements so as to prevent wind and water erosion of the minerals which comprises applying to the surface of the masses of finely-divided minerals a relatively thin coating at a rate of from 0.5 to 15 pounds of solids per 100 square feet of area of mineral mass of an emulsion of a copolymer of ethyl acrylate and acrylonitrile and which extends downwardly into the mass of minerals only a fraction of the total depth of the mass so as to provide a continuous film over the surface of the minerals whereby the normally exposed surfaces are rendered resistant to the erosive action of wind and water.

4. The process of protecting the surfaces of relatively large masses of finely-divided minerals on exposure to the elements so as to prevent wind and water erosion of the minerals which comprises applying to the surface of the masses of finely-divided minerals a relatively thin coating at a rate of from 0.5 to 15 pounds of solids per 100 square feet of area of mineral mass of an emulsion of a copolymer of ethyl acrylate and styrene and which extends downwardly into the mass of minerals only a fraction of the total depth of the mass so as to provide a continuous film over the surface of the minerals whereby the normally exposed surfaces are rendered resistant to the erosive action of wind and water.

5. The process of protecting the surfaces of relatively large masses of finely-divided minerals on exposure to the elements so as to prevent wind and water erosion of the minerals which comprises applying to the surface of the masses of finely-divided minerals a relatively thin coating at a rate of from 0.5 to 15 pounds of solids per 100 square feet of area of mineral mass of an emulsion of plasticized polyvinyl acetate and which extends downwardly into the mass of minerals only a fraction of the total depth of the mass so as to provide a continuous film over the surface of the minerals whereby the normally exposed surfaces are rendered resistant to the erosive action of wind and water.

6. The process of protecting the surface of a relatively large mass of finely-divided minerals so as to prevent wind and water erosion of the mineral which comprises: spraying an aqueous emulsion of a water-insoluble elastomeric substance on the surface of a mass of a finely-divided mineral at from 0.5 to 15 pounds of emulsion solids per 100 square feet of area of mineral mass, permeating the surface of the mineral mass with said emulsion and solidifying the elastomer content so that the elastomeric substance extends a fraction of the total depth into the mass, and binds the particles near the surface together to form a protective layer, whereby the normally exposed surfaces are rendered resistant to the erosive action of wind and water.

7. The process of claim 6 in which the penetration of the aqueous emulsion into the mineral mass is aided by the presence of a wetting agent.

8. The process of claim 7 in which the mineral mass is pre-wetted by an aqueous solution of a wetting agent before said aqueous emulsion is applied.

9. The process of claim 7 in which at least the surface of the mineral fines are pre-wetted with water, and not more than 3 pounds of emulsion solids are used for 100 square feet of area.

10. The process of claim 9 in which the emulsion is of a copolymer of butadiene and styrene.

References Cited in the file of this patent

UNITED STATES PATENTS

| | | |
|---|---|---|
| Re. 20,029 | Fischer | July 7, 1936 |
| 2,020,256 | Copeman | Nov. 5, 1935 |
| 2,040,818 | Badollet | May 19, 1936 |
| 2,121,036 | Irons | June 21, 1938 |
| 2,204,781 | Wattles | June 18, 1940 |
| 2,329,148 | Leeuwen | Sept. 7, 1947 |
| 2,492,488 | Kremer | Dec. 27, 1949 |
| 2,582,701 | Iknayan | Jan. 15, 1952 |

UNITED STATES PATENT OFFICE
CERTIFICATE OF CORRECTION

Patent No. 2,854,347                                              September 30, 1958

Robert B. Booth et al.

It is hereby certified that error appears in the printed specification of the above numbered patent requiring correction and that the said Letters Patent should read as corrected below.

Column 3, line 9, for "bituminus" read -- bituminous --; line 73, for "GRS 200" read -- GRS 2000 --.

Signed and sealed this 24th day of March 1959.

(SEAL)
Attest:

KARL H. AXLINE                                              ROBERT C. WATSON
Attesting Officer                                         Commissioner of Patents